(12) United States Patent
Wild

(10) Patent No.: US 7,391,224 B2
(45) Date of Patent: Jun. 24, 2008

(54) SENSOR ARRANGEMENT

(75) Inventor: Gerhard Wild, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 174 days.

(21) Appl. No.: 10/497,682

(22) PCT Filed: Dec. 3, 2002

(86) PCT No.: PCT/DE02/04429

§ 371 (c)(1),
(2), (4) Date: Jun. 4, 2004

(87) PCT Pub. No.: WO03/053750

PCT Pub. Date: Jul. 3, 2003

(65) Prior Publication Data

US 2005/0088274 A1    Apr. 28, 2005

(30) Foreign Application Priority Data

Dec. 7, 2001    (DE) .............................. 101 60 121

(51) Int. Cl.
*G01R 27/00* (2006.01)
(52) U.S. Cl. ........................... 324/691; 324/722
(58) Field of Classification Search ............. 324/691, 324/722
See application file for complete search history.

(56) References Cited

U.S. PATENT DOCUMENTS

| | | | |
|---|---|---|---|
| 4,314,227 A | 2/1982 | Eventoff | |
| 4,314,228 A | 2/1982 | Eventoff | |
| 5,896,090 A | 4/1999 | Okada et al. | |
| 6,584,387 B1 * | 6/2003 | Norton | 701/45 |
| 6,794,728 B1 * | 9/2004 | Kithil | 257/532 |

FOREIGN PATENT DOCUMENTS

| | | |
|---|---|---|
| DE | 42 37 072 C1 | 12/1993 |
| DE | 44 06 897 C1 | 5/1995 |
| DE | 197 52 976 C2 | 5/2000 |
| DE | 200 14 200 U1 | 1/2001 |
| DE | 199 56 545 C1 | 4/2001 |

OTHER PUBLICATIONS

Datasheet KP100, "Surface Micromachined Absolute Pressure Sensor For Side Airbag Applications," Infineon Semiconductor Sensor Group, AN P002, pp. 1-8, Jan. 4, 2002.
Datasheet KP202-R, KP203-R, "Silicon Piezoresistive Relative Pressure Sensors Low Cost Surface Mounted Version," Semiconductor Sensors, pp. 12, 2001 no month available.
Total Pressure Cells, Boart Longyear Interfels, Jun. 4, 2004.

* cited by examiner

*Primary Examiner*—Vincent Q. Nguyen
(74) *Attorney, Agent, or Firm*—Laurence A. Greenberg; Werner H. Stemer; Ralph E. Locher

(57) ABSTRACT

The invention relates to planar sensor arrangements, in particular seat mat sensors, for recognition of seat occupancy in a motor vehicle, comprising several pressure sensitive sensor elements, arranged in a planar distribution, the electrical properties of which are dependent on the local value of a measured parameter and having at least one non-rotationally symmetrical sensor element on an insulation-dependent fold line of the sensor arrangement, with a longest sectional line through the active surface of the sensor element arranged along the fold line.

5 Claims, 4 Drawing Sheets

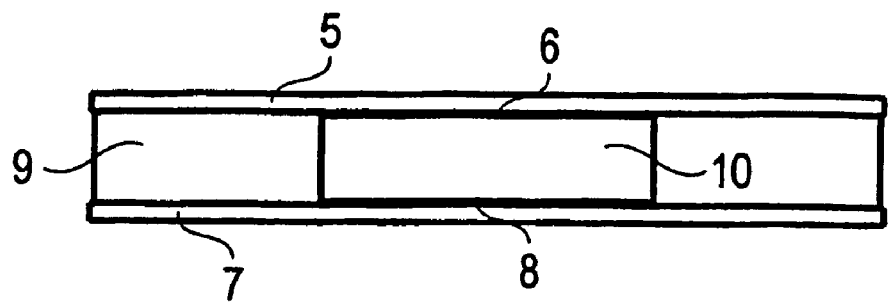
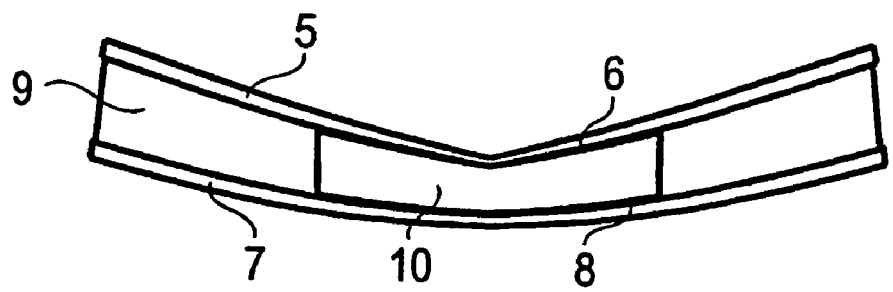
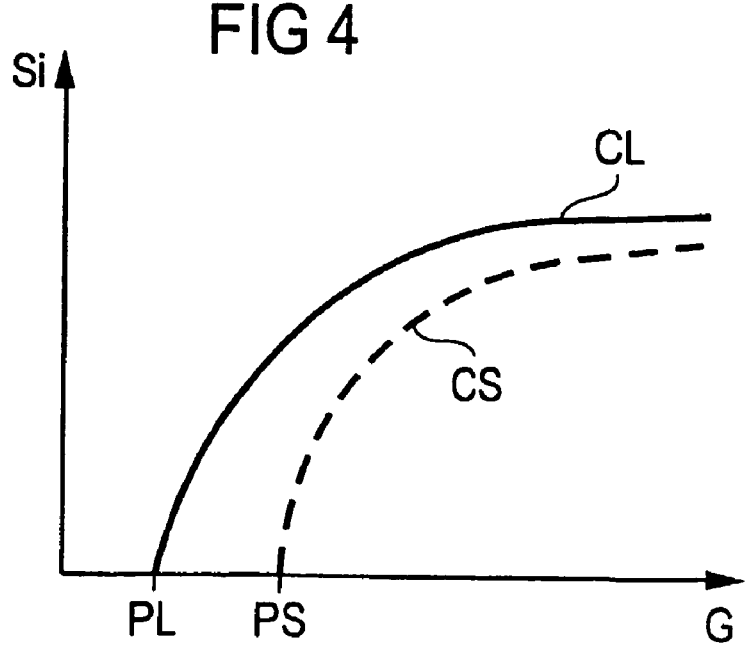

SENSOR ARRANGEMENT

CLAIM FOR PRIORITY

This application claims priority to International Application No. PCT/DE02/04429, which was published in the German language on Jul. 3, 2003, which claims the benefit of priority to German Application No. 101 60 121.2 which was filed in the German language on Dec. 7, 2001.

TECHNICAL FIELD OF THE INVENTION

The invention relates to planar sensor arrangements, in particular seat mat sensors for recognition of seat occupancy in a motor vehicle.

BACKGROUND OF THE INVENTION

Seat occupancy by motor vehicle passengers plays a major role in a plurality of technical applications in motor vehicles. This applies especially to vehicle occupant restraint systems, the efficient deployment of which is very often made dependent upon the seating position of the vehicle occupant.

The simplest form of recognizing seat occupancy is the detection of the presence of a vehicle occupant by, for example, touch-sensitive switches in the vehicle seat. Other measurement systems for the recognition of seat occupancy detect the weight of a vehicle occupant or even their weight distribution on a vehicle seat. On the one hand, this enables the detection of the presence of a vehicle occupant whilst, on the other hand, their body weight or weight distribution on the vehicle seat can be determined. Depending on the sensor arrangement and measurement method, these two sets of data can be measured simultaneously or independently of each other.

Seat mat sensors are mostly used to detect the measured variable, in particular weight, comprising a plurality of pressure-sensitive sensor elements which are arranged on the seat face distributed in rows and columns.

Known from the prior art are, in particular, sensor elements in seat mat sensors essentially comprising two electrically separating films arranged in a mutually parallel manner. Between said two films is disposed a likewise electrically separating interface layer which maintains the distance between the two films. Electrically conductive faces are applied to the mutually facing sides of the films between which high-resistance material is arranged, preferably air.

When the seat mat sensor is subject to pressure, for example the body weight of a vehicle occupant, the conductive faces are brought into conductive contact with each other, so that the electrical contact resistance between the two conductive faces is dependent on the pressure amplitude.

The conductive faces of known sensor elements, hereinafter also referred to as sensor cells, have rotational symmetry about the face perpendicular. In a sensor arrangement in the form of a seat mat sensor, a plurality of similar circular sensor cells are arranged in a planar manner on a vehicle seat.

Sensor arrangements of this kind are known from U.S. Pat. No. 5,896,090 A, German Application No. 200 14 200 U1 and German Application No. 42 37 072 C1; suitable sensor cells for these sensor arrangements are disclosed in U.S. Pat. No. 4,314,228, German Application No. 200 14 200 U1 and U.S. Pat. No. 4,314,227.

The problem with the known sensor arrangements is that the sensor cells are mostly affixed to an uneven surface of a vehicle seat thereby exposing the sensor cells to differing tensile or bending loads, depending on their position on the seat mat sensor, in particular along fold lines of the sensor arrangement.

The sensor elements known from the prior art are designed to respond very sensitively to such tensile or bending loads on the fold lines. Consequently the signal characteristic of the sensor elements dependent on the weight acting upon them changes. The bending of the sensor elements usually displaces a constant offset PL of the signal characteristic to lower values as shown in FIG. 4. This signal characteristic displacement can have various repercussions for various measurement systems designed for recognizing seat occupancy.

An occupant may be detected on the vehicle seat even if only a small, light object is located on it. In the event of vehicle impact this false information would cause an airbag to inflate unnecessarily in order to protect the supposed vehicle occupant.

In other systems designed for recognizing seat occupancy, a shift in the constant offset of the sensor characteristic causes a false weight or false weight distribution of a vehicle occupant to be reported to the occupant safety system. If an occupant safety device is, for example, released too early on the basis of this false information, this can result in serious injuries to a vehicle occupant.

The change in the sensor characteristics when the sensor element is exposed to a tensile or bending load on a vehicle seat fold line is referred to as the preload effect.

Owing to the preload effect an arrangement of sensor cells in seat mat sensors is often avoided at heavily curved points or on seams of a vehicle seat, although the lack of measurement at such points results in a loss of important information regarding the vehicle occupant. This can also lead to serious injuries to a vehicle occupant in the event of an accident involving impact if the occupant safety system was unable to provide the optimum protection for the vehicle occupant through lack of information.

A further measure for avoiding the preload effect is to reduce the size of the conductive faces of the known sensor cells.

With small sensor cells the constant offset (PS) of the sensor characteristic generally has a higher value than with larger sensor cells (FIG. 4). As a result, the preload effect manifests itself only at far greater bending loads than in the case of large-face sensor elements. However, the sensor characteristic of a smaller sensor cell (CS) loses some of its resolution accuracy by comparison with the characteristic of a larger sensor cell (CL), since the slope of its signal characteristic becomes steeper. At the same time the range of values of its characteristic also becomes smaller (FIG. 4).

Here again as a result of too much imprecise information regarding the vehicle occupant, an optimal protection effect of an occupant protection system adapted to seating occupancy fails to take place.

SUMMARY OF THE INVENTION

The invention discloses an improved seat mat sensor so that the sensor elements also enable informative weight measurements to be made on installation-dependent fold lines on a vehicle seat.

In one embodiment of the invention, at least one sensor element in the sensor arrangement is not of a rotationally symmetric design and has the advantage that, arranged along a installation-dependent fold line, it has a very small preload effect yet, independently of this, it achieves a very good resolution of the weight-dependent sensor signal within a very large range of values.

The rotationally symmetric structure of the active faces of the known sensor elements must therefore be forgone with such installation dependent fold lines in favor instead of a non-rotationally symmetric active face of the sensor elements. Circular active faces are known from the prior art. These can be replaced by, for example, oval active faces. Further embodiments are also possible, however.

Fold lines on a vehicle seat are, for example, curved surfaces on a leg support or on both seat side supports or along seams in the seat cover.

The active face of a sensor element is understood to be the planar projection of the sensor region which, within the useful range of the sensor characteristic—that is to say, before an essentially constant maximum value of the sensor characteristic is attained, contributes to the sensor characteristic in a manner dependent on weight and affecting the signal (FIG. 4).

For improved electrical contacting, a circular sensor element may quite possibly have indentations on its circumference which, for example, are extended as a supply lead via the seat mat to the evaluation electronics of the seat mat sensor. The active face of the sensor element is nevertheless circular. In this sense, the term rotational symmetry is also used.

BRIEF DESCRIPTION OF THE DRAWINGS

The invention is described below with reference to the exemplary embodiments in the drawings, in which:

FIG. 3a shows a cross-section through a known rotationally symmetric small sensor element.

FIG. 3b shows the cross-section through the sensor element shown in FIG. 3a influenced by a bending load.

FIG. 4 shows a signal characteristic Si of a known rotationally symmetric sensor element with a large face CL and of a sensor cell with a small face CS.

The measured variable is hereafter considered to be the force on the sensor cells due to weight.

A sensor element with a circular or oval active face is hereafter also referred to in abbreviated form as a circular or oval sensor element.

DETAILED DESCRIPTION OF THE INVENTION

Figure 1:
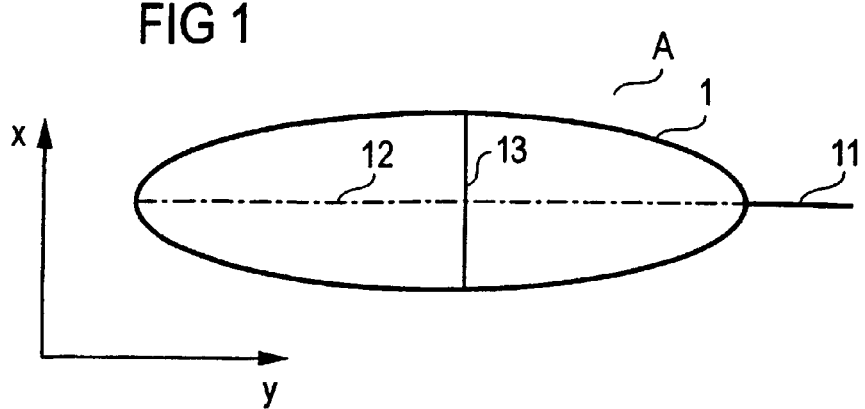
FIG. 1 shows the oval face of a sensor element 1 according to the invention with an electrical supply lead 11 in a diagrammatic view.

FIG. 1 shows an oval sensor element 1 according to the invention. The oval 1 drawn with a continuous line is the upper of the two conductive sensor element faces arranged one above the other. The line leading away from this to one side is its electrical supply lead 11. The lower of the two conductive faces is not shown. The active face is not rotationally symmetric. A longest line of intersection 12 through the sensor element is drawn as a dashed and dotted line.

When the sensor element is bent about the longest line of intersection 12 the sensor signal changes, while a force due to weight acts on the sensor element in an otherwise unchanged manner. The constant offset of the characteristic curve of the sensor element is displaced towards smaller values.

When bending occurs about an axis 13 perpendicular thereto, the displacement of the sensor characteristic is, however, substantially more pronounced. The numerical value of the constant offset is even smaller, that is to say, with a bending axis 13 the preload effect is much greater than in the case of the axis 12 perpendicular thereto.

An installation-dependent fold line of the sensor arrangement 1 therefore lies preferably along the longest line of intersection 12.

Owing to installation tolerances in the motor vehicle, this most favorable sensor element fitting position cannot always be achieved in practice, however. The length of the line of intersection through the sensor element along the fold line can vary by up to ±30% from the longest line of intersection 12.

Figure 2A:
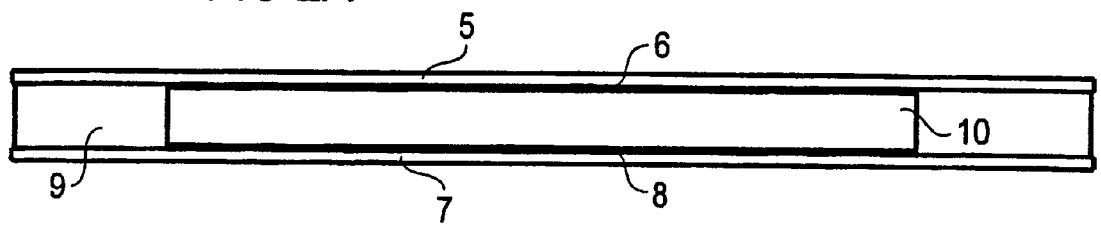
FIG. 2a shows a cross-section through a known rotationally symmetric large sensor element.

This bending sensitivity principle will now be explained with reference to FIGS. 2a to 3b. FIG. 2a shows a cross-section through a known sensor element in a seat mat sensor arrangement. An upper sensor film 5 of non-conductive material is arranged parallel to a lower sensor film 7 of the same kind. The two films are kept mutually spaced apart by a spacer 9 made of likewise non-conductive material 10. On each of the mutually facing sides, conductive faces 6 and 8 are applied to the films. Between the two conductive faces is arranged high-resistance material, in particular air.

Figure 2B:
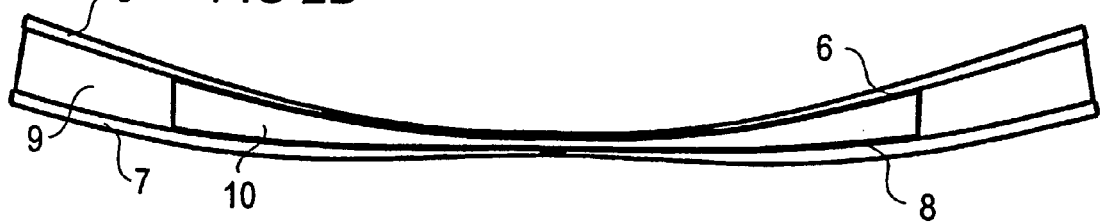
FIG. 2b shows the cross-section through the sensor element shown in FIG. 2a influenced by a bending load.

FIG. 2b shows the cross-section of the sensor element shown in FIG. 2a, the sensor element being bent about a fold line under the effect of a force. Since the two conductive faces 6 and 8 have the same length along the cross-section but are kept apart by their spacers 9, using a defined distance, the upper contact face 6 is more heavily curved than the lower contact face 8. This results in the two conductive faces 6 and 8 coming very close together at the point of their greatest curvature. If the two contact faces continue to be bent in this region, electrical contact can occur between the two conductive faces 6 and 8.

Since the two faces are positioned on an electrically different potential, a current dependent on the contact resistance flows between the two conductive faces. The greater the contact face, the smaller the contact resistance between them. The variation in the contact resistance according to the contact face thus generated is also utilized in the measurement of a weight resting thereon.

Deflection of the sensor element until electrical contacting takes place between the two conductive faces thus generates a false weight signal. This is referred to as a preload effect. The evaluation unit of the seat mat sensor cannot distinguish between this preload effect caused by bending of the sensor cell and a weight signal.

The sensor signal generated by a bending of the sensor element is evaluated in the same way as a weight resting thereon. A plurality of methods can be used to evaluate the sensor signals in such cases as follows.

To maintain a constant flow of current between faces 6 and 8 constant, the voltage is varied according to the contact resistance between the faces. The greater the contact face of the two conductive faces, the smaller the contact resistance becomes. The more the sensor element is deflected, the smaller is therefore the voltage required for the constant flow of current.

Alternatively, the sensor signals can also be evaluated at a constant voltage. The measure used for the weight resting on the faces is then the variable flow of current over the contact resistance of the two conductive faces 6 and 8.

FIG. 3a shows the cross-section of a sensor element of a structure identical to that shown in FIGS. 2a and 2b. The planar extension of the conductive faces in a cross-sectional direction is much smaller, however.

FIG. 3b shows the cross-section of the sensor element shown in FIG. 3a under the effect of the same bending about a fold line out of the plane of projection. At the points of greatest curvature the distance between the two conductive faces 6 and 8 is greater than the comparable distance in FIG. 2b.

For an electrical contact to be produced between the conductive faces 6 and 8, the smaller sensor element in FIG. 3b must be considerably more heavily curved than the larger sensor element in FIG. 2b. With the known sensor cell structure a smaller sensor element face is therefore less sensitive to the preload effect than a larger face. The signal resolution of the characteristic curve is also reduced as follows, however.

FIG. 4 shows a characteristic curve for a large sensor element CL and for a small sensor element CS in a diagrammatic view. For the sake of clarity the graph assumes that the sensor elements have ordinary rotationally symmetric conductive faces. The sensor signal Si is plotted along the X-axis. The Y-axis shows the force due to weight G acting on the sensor cell.

The continuous line CL represents the characteristic curve for the large-face sensor element as follows. After attainment of a minimum force due to weight PL is the upper conductive face 6 of the sensor element pushed through to such an extent that electrical contact with the lower conductive face 8 is achieved. Curve CL slopes continuously upwards as a result of the increasing force imposed by weight G. The contact face between the two conductive faces 6 and 8 becomes larger and larger until the sensor signal approaches a constant value. Thereafter no additional sensor signal can be generated even if there is a further increase in the force due to weight G.

The broken line CS shows the characteristic curve for the small-face sensor element in diagrammatic form as follows.

More force due to weight PS has to be applied with this sensor element than with the large-face sensor element before a minimum signal is first emitted. Thereafter this characteristic curve also slopes continuously upwards with an increase in the force due to weight G until it attains a constant value which does not increase further even with a further increase in the force due to weight G. This constant maximum signal value is lower for the smaller sensor element than for the larger sensor element.

The slope of the characteristic curve CS is, however, steeper than the curve CL. The signal of the small sensor element CS responds much more sensitively to a variation in the force due to weight G than the signal of the larger sensor element CL. The resolution accuracy of the force due to weight acting on the sensor elements is reduced as a result. It can, however, be very important, particularly for the purpose of classifying a vehicle occupant according to weight, for the sensor characteristic to permit the greatest possible resolution of the force due to weight acting upon the sensor. A characteristic curve with a slight slope is therefore preferable to a steeper characteristic curve.

In the case of sensor elements having the known structure having two spaced-apart conductive faces, the object of the invention is therefore achieved preferably by conductive faces of the kind that, when deformed about a fold line, have the largest possible face along that line. That is to say, their line of intersection through the sensor face should be as long as possible along the fold line. As already mentioned above, the line of intersection of the sensor faces along the fold line, installation-dependent0, usually achieves a length that can vary by up to ±30% from the maximum line of intersection.

With this sensor element shape, the sensor signal is decisively influenced only where there is a much greater deflection than is the case with the known rotationally symmetric elements. In the extension direction perpendicular to the fold line the face is preferably smaller—that is to say, the line of intersection of the sensor faces along the perpendicular to the fold line is shorter—in order to achieve very good signal resolution.

The oval sensor face 1 shown in FIG. 1 is an exemplary embodiment of the invention.

Figure 5A:
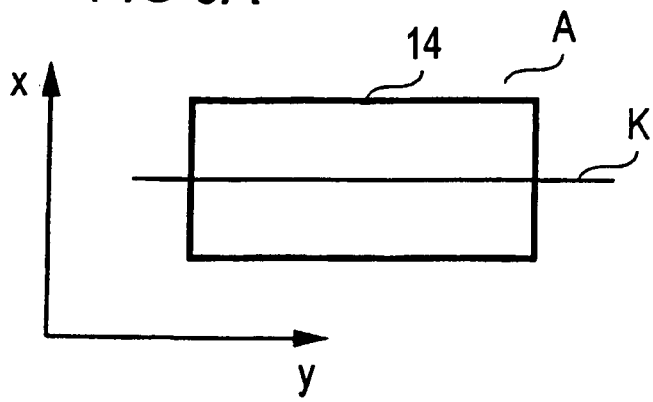
FIGS. 5a and 5b show further exemplary embodiments of the geometric shape of the faces of a sensor element A according to the invention.
Figure 5B:
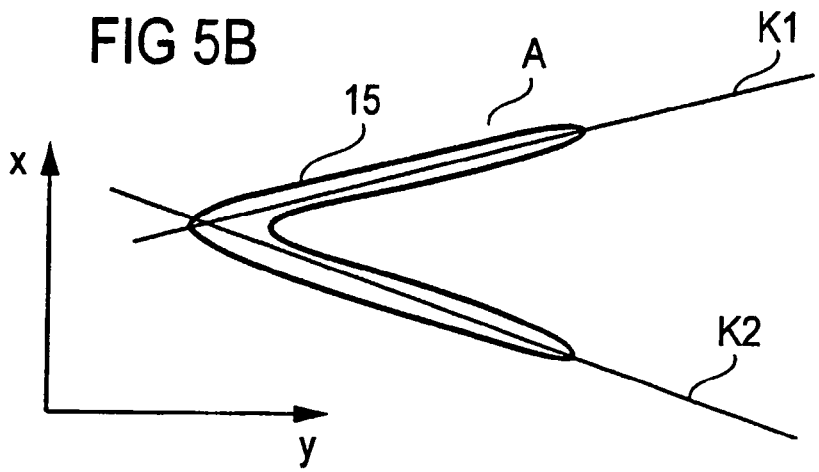
Figure 6:
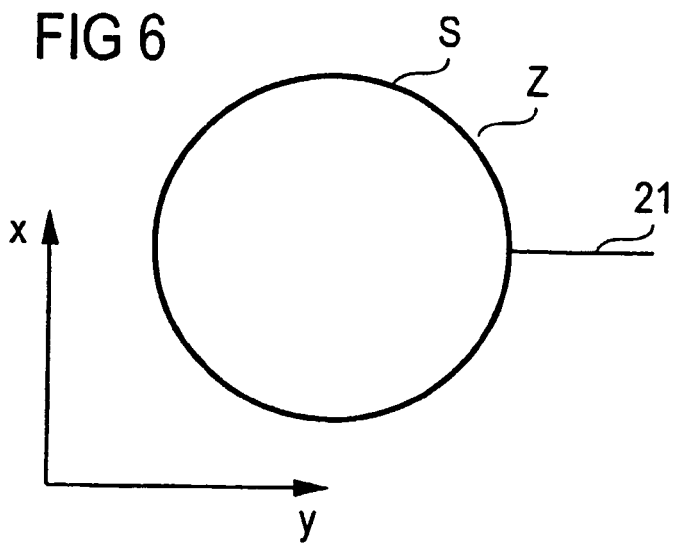
FIG. 6 shows: the circular face of a known sensor element S in plan view.

FIGS. 5a and 5b show further embodiments of the invention. There are various advantageous sensor faces depending on the position of the sensor element fold lines as follows.

FIG. 5a shows a rectangular sensor face 14, which is especially suitable for a fold line K path likewise shown. The oval sensor face 1 from FIG. 1 could just as well be used here, however.

FIG. 5b shows a boomerang-shaped sensor element 15 as a preferred embodiment of the sensor face in the region of two intersecting fold lines K1 and K2.

Figure 7:
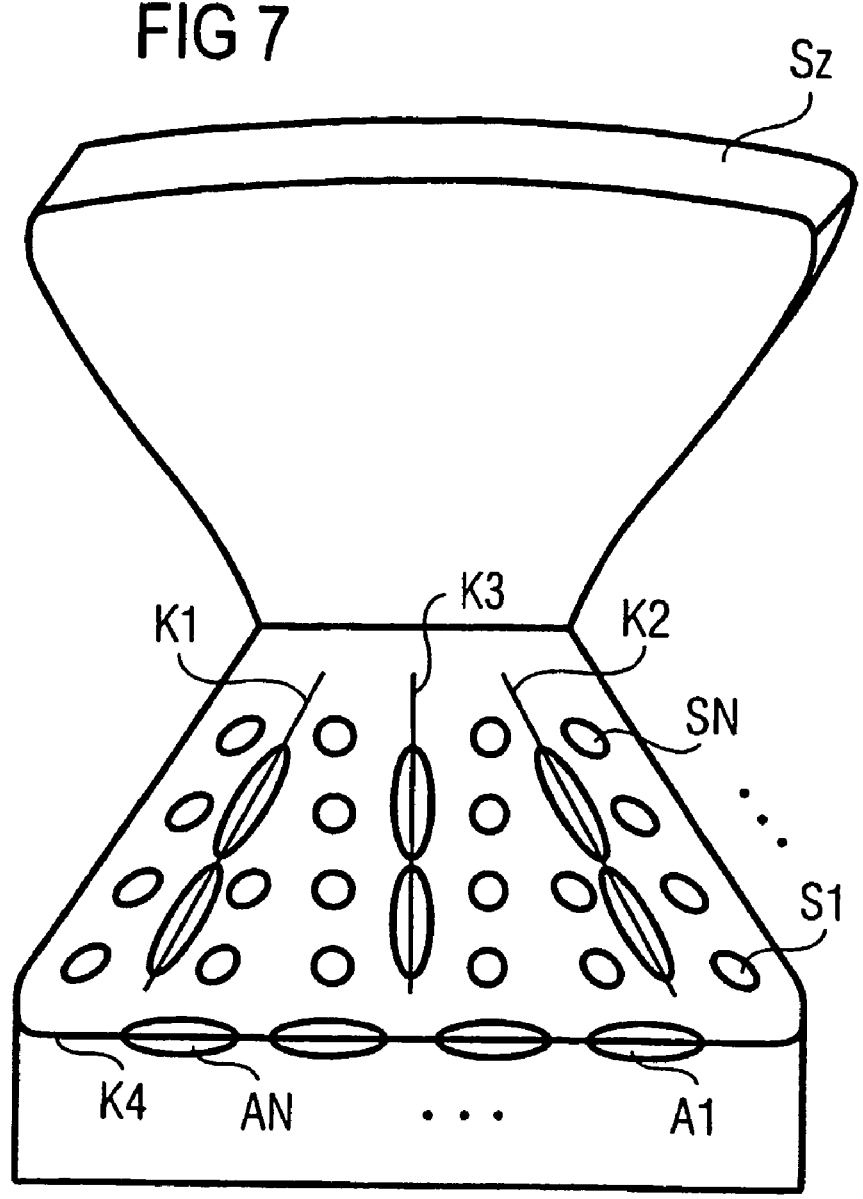
FIG. 7 shows a possible arrangement of circular and oval sensor elements on a vehicle seat.

FIG. 7 shows a possible arrangement of circular and therefore rotationally symmetric sensor elements S1, S2, . . . SN on a vehicle seat Sz. On the fold lines K1 to K4 of the vehicle seat the shape of the mostly circular sensor elements S to SN has been modified to the oval and therefore asymmetric, that is to say not rotationally symmetric, shape of the sensor elements A1 to AN.

The invention is not restricted to the exemplary embodiments disclosed. Instead a plurality of modifications and variations is possible, and these can differ according to the position in which a sensor element is to be fitted.

What is claimed is:

1. A sensor arrangement for recognition of seat occupancy in a motor vehicle, comprising:
   a plurality of pressure-sensitive sensor elements arranged distributed in a planar manner, each of the plurality of sensor elements having an electrical performance dependent upon a local value of a measured variable;
   at least one of the of sensor elements being a non-rotationally symmetric pressure-sensitive sensor element including an active face, the active face having dimensions defining a longest line of intersection extending through the active face and a shortest line of intersection extending through the active face; and
   the non-rotationally symmetric sensor element located on an installation-dependent fold line of a vehicle seat such that the longest line of intersection lies along the fold line.

2. The sensor arrangement according to claim 1, wherein the active face of the non-rotationally symmetric sensor element has oval shape.

3. The sensor arrangement according to claim 1, wherein each of the plurality of sensor elements include:
   an upper non-conductive film disposed above a lower non-conductive film;
   a first conductive face disposed on the upper film, and a second conductive face disposed on the lower film; and
   a region located between the first conductive face and the second conductive face, the region filled with a non-conductive material.

4. The sensor arrangement according to claim 1, wherein more than one of the plurality of sensor elements are substantially rotationally symmetric.

5. The sensor arrangement according to claim 1, wherein more than one of the plurality of sensor elements are arranged on installation-dependent fold lines of a vehicle seat in an exclusively non rotationally symmetric manner.

* * * * *